(12) United States Patent
Langton et al.

(10) Patent No.: US 6,284,681 B1
(45) Date of Patent: Sep. 4, 2001

(54) REACTIVE COMPOSITE COMPOSITIONS AND MAT BARRIERS

(75) Inventors: Christine A. Langton, Aiken, SC (US); Rajendran Narasimhan, Evans, GA (US); David G. Karraker, Aiken, SC (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 09/263,907

(22) Filed: Mar. 5, 1999

(51) Int. Cl.[7] .................................................. B32B 5/16
(52) U.S. Cl. ........................... 442/417; 442/380; 442/414
(58) Field of Search ................................... 442/376, 380, 442/414, 417

(56) References Cited

U.S. PATENT DOCUMENTS

| | | |
|---|---|---|
| 3,274,784 | 9/1966 | Shock et al. . |
| 3,379,013 | 4/1968 | Slagle et al. . |
| 3,925,992 | 12/1975 | Bäckström . |
| 3,988,258 | 10/1976 | Curtiss et al. . |
| 4,187,187 | 2/1980 | Turbeville . |
| 4,321,158 | 3/1982 | Beall et al. . |
| 4,430,256 | 2/1984 | Rustum . |
| 4,565,468 | 1/1986 | Crawford . |
| 4,974,379 | 12/1990 | Phillips . |
| 5,041,330 | * 8/1991 | Heerten et al. ........................ 428/213 |
| 5,237,945 | 8/1993 | White . |
| 5,360,294 | 11/1994 | Carriker et al. . |
| 5,388,931 | 2/1995 | Carlson . |
| 5,389,166 | 2/1995 | White . |
| 5,403,126 | 4/1995 | Carriker et al. . |
| 5,436,050 | 7/1995 | Carriker et al. . |
| 5,464,473 | 11/1995 | Shiao . |
| 5,529,438 | 6/1996 | Carriker et al. . |

* cited by examiner

Primary Examiner—Elizabeth M. Cole
Assistant Examiner—Ula C. Ruddock
(74) Attorney, Agent, or Firm—Dority & Manning PA

(57) ABSTRACT

A hazardous material storage area has a reactive multi-layer composite mat which lines an opening into which a reactive backfill and hazardous material are placed. A water-inhibiting cap may cover the hazardous material storage area. The reactive multi-layer composite mat has a backing onto which is placed an active layer which will neutralize or stabilize hazardous waste and a fronting layer so that the active layer is between the fronting and backing layers. The reactive backfill has a reactive agent which can stabilize or neutralize hazardous material and inhibit the movement of the hazardous material through the hazardous material storage area.

8 Claims, 2 Drawing Sheets

REACTIVE COMPOSITE COMPOSITIONS AND MAT BARRIERS

Statement as to Rights to Inventions Made Under Federally Sponsored Research and Development The U.S. Government has rights in this invention pursuant to Contract No. DE-AC09-89SR18035 between Westinghouse Savannah River Company and the U.S. Department of Energy.

BACKGROUND OF THE INVENTION

Contamination of the environment is a growing concern in the United States and in the world. As a result, there have been many inventions which have tried to effect the safe storage of hazardous waste such as radionuclides, hazardous metals, soluble contaminants, medical waste, and other hazardous materials.

Geological disposal of these wastes is one common approach. Typically, these wastes are contained by providing multiple levels of various types of physical barriers surrounding the hazardous waste to prevent migration into the environment. The barriers can include, for example, waste containers, vaults, engineered backfill materials, and barriers mats. Each subsequent barrier is designed to contain the hazardous material should the earlier barrier fail. Some of the previous inventions include U.S. Pat. Nos. 5,464,463, 4,321,158, 3,988,258, and 3,274,784. While all the aforementioned patents for hazardous material barriers may perform satisfactorily in specific situations, there is room for improvement in the art.

SUMMARY OF THE INVENTION

Therefore, it is an object of the present invention to provide interactive barrier compositions capable of reducing the migration of hazardous material into the environment.

It is another object of the present invention to provide a method of inhibiting release of hazardous materials into the environment.

It is a further object of the present invention to provide a reactive multi-layer composite mat for radioactive and hazardous waste containment.

It is still another object of the present invention to provide a backfill composition capable of reducing the migration of hazardous materials including radionuclides, hazardous metals and soluble contaminants into the environment.

These and other objects of the invention may be provided as part of a mixed waste disposal system and facility. The mixed waste facility area makes use of a reactive multi-layer composite mat comprising at least one reactive agent for stabilizing hazardous material. Containers of waste materials are placed in proximity to the composite mats. Additional reactive backfill may be added to further surround the waste material. A water resistant cap is placed over the mat/waste/backfill area.

In another preferred embodiment of the invention, the reactive multi-layer composite mat has an active layer having at least one reactive agent, a backing material onto which the active layer is placed, and a fronting material which covers the other side of the active layer so that the active layer is positioned between the backing and fronting materials.

In yet another preferred embodiment of the invention, a reactive backfill for stabilizing hazardous waste comprises cement, fly ash, sand, water, and reagents. The reactive agents can be ion exchange resins, zeolites, iron powders, blast furnace slag, titanate compounds, phosphate compounds, or attapulgite clay. The attapulgite clay may be heat treated (calcined) which modifies the surface crystal structure and provides improved adsorptive capabilities. In a preferred embodiment of the invention, the reactive backfill is made less permeable by water by the addition of a clay such as bentonite.

The accompanying drawings, which are incorporated in and constitute a part of the specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
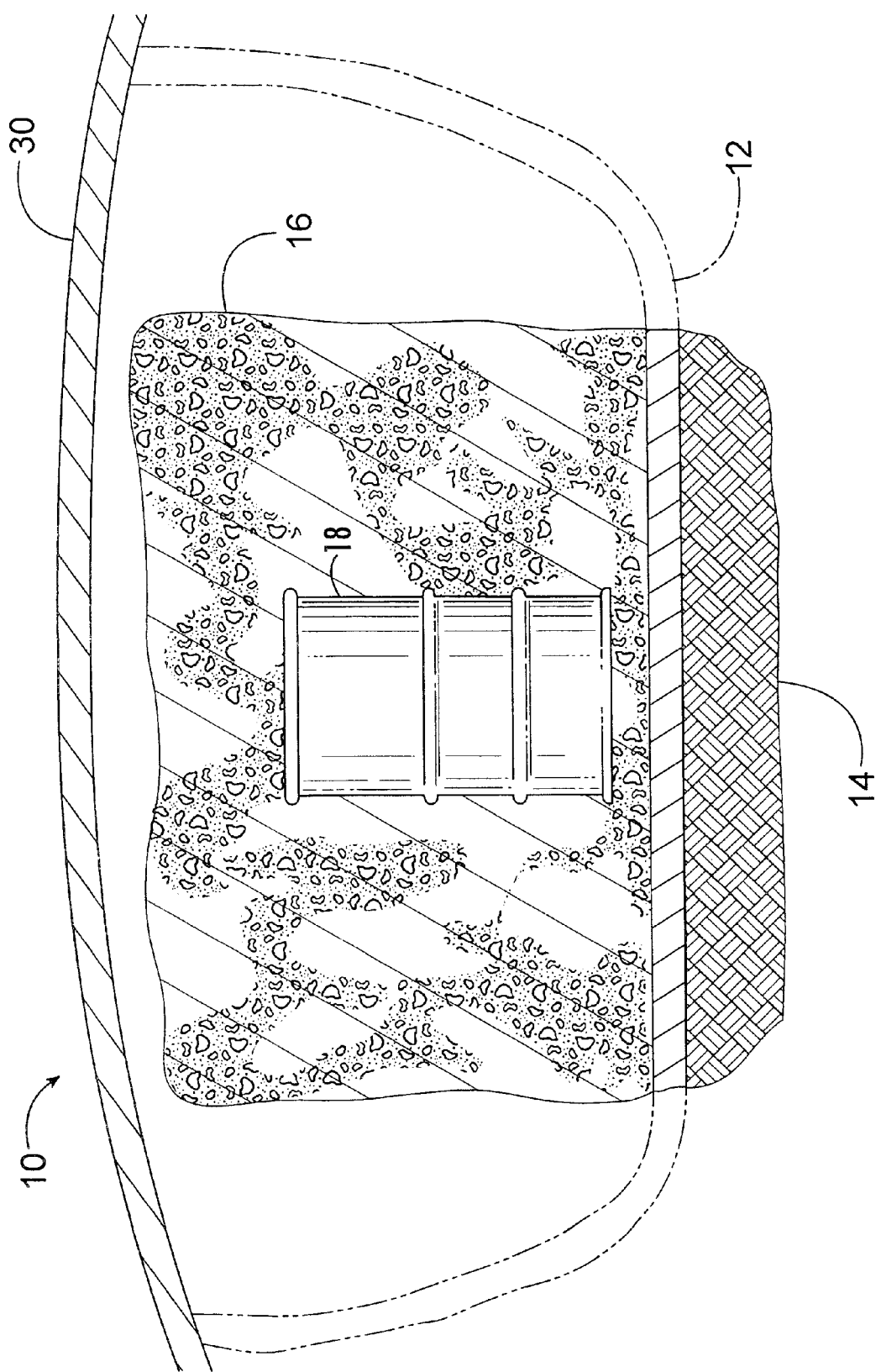
FIG. 1 is a cross-sectional view of a hazardous material storage area according to a preferred embodiment of the invention.

Repeat use of reference characters in the present specification and drawings is intended to represent same or analogous features or elements of the invention.

DETAILED DESCRIPTION OF THE PREFERRED EMBODIMENTS

As used herein, the term "mixed waste" may refer to a combination of a radioactive and a hazardous waste material. It is understood that a reactive composite or a facility constructed to handle mixed waste is also able to handle waste material having only a radioactive waste material or only a hazardous waste material. In its broadest meaning, hazardous waste includes any chemical or biological agent, the release of which into the general environment is undesired. Reactants which are designed to interact with the radioactive or hazardous waste include any material capable of immobilizing, binding to, or altering the waste material to a less harmful product. While certain reactants are described herein, the listing of reactant materials is not designed to limit the invention to only those materials.

Reference will now be made in detail to presently preferred embodiments of the invention, one or more examples of which are illustrated in the accompanying drawings. Each example is provided by way of explanation of the invention, not limitation of the invention. It will be apparent to those skilled in the art that modifications and variations can be made in the present invention without departing from the scope or spirit thereof. For instance, features illustrated or described as part of one embodiment may be used on another embodiment and which may yield a still further embodiment. Thus, it is intended that the present invention covers such modifications and variations as come within the scope of the appended claims and their equivalents.

Hazardous waste can come in many forms including chemicals, hazardous metals, biological agents, and various soluble contaminants. The hazardous waste may take the form of solids, liquids, and/or gases. Hazardous wastes and mixed waste may also undergo further reactions which may create additional forms or new constituents of waste material. Radioactive materials present in mixed waste may include cesium, strontium, technetium, neptunium, plutonium, and uranium isotopes with one or more valance states. The hazardous metals could be, for example, chromium, lead, barium, arsenic, selenium, mercury, silver, and cadmium. It should be appreciated that hazardous materials are typically pretreated and packaged before they qualify for disposal.

As shown in FIG. 1, a hazardous material storage area 10 is typically placed underground. The hazardous material storage area may be made below the ground's surface or at the surface, depending on the needs of the user. The hazardous material storage area 10 is constructed by providing a reactive multi-layer composite mat 12 which is supported by the surrounding soil 14. An area inside of mat 12 comprises one or more reactive reagents. A container 18 with hazardous material is placed within the storage area. The hazardous material may be stored in a variety of containers, a common one being a 55-gallon drum. Reactive backfill 16 is then compacted around the hazardous material storage container 18 so as to immobilize and stabilize the storage container 18. The backfill 16 should regulate the flow rate of water or fluids which may percolate through to the mat 12. If, for example, the reactive backfill 16 is primarily made of clay, the reactive backfill may be compacted if desired to maximize water impermeability. A cap 30 may be placed over the hazardous material storage area 10. The cap should be substantially impermeable to restrict the flow of water into the hazardous material storage area 10.

As seen in FIG. 1, mat 12 may comprise a single unit which lines the side and base of the storage area. Alternatively, a plurality of individual mats may be used in place of a single continuous mat. The mats 12 may be overlapped into multiple layers as required. Further, mats 12 may be used solely on the sides of the storage area, with the reactive backfill 16 used as the reactive barrier beneath the waste containers 18 and on top of the soil layer 14.

Mats 12 may be constructed "in situ" and conform to any desired shape or thickness needed to accommodate the hazardous material or the dimensions of the waste storage area. The composite mat 12 may have one or more sand layers present to avoid damage or disruption to the underlying fabric layers or reactive layers by heavy equipment used to construct the mat.

The cap 30 may be comprised in whole or part of a mat 12 and/or a reactive backfill. In certain environments, the hazardous material could pass through the protective cap 30 through capillary or wicking action of the materials, physical breaching of the cap material, or transpiration and evaporation. Including a reactive material within the cap provides an additional safeguard against such loss.

Figure 2:
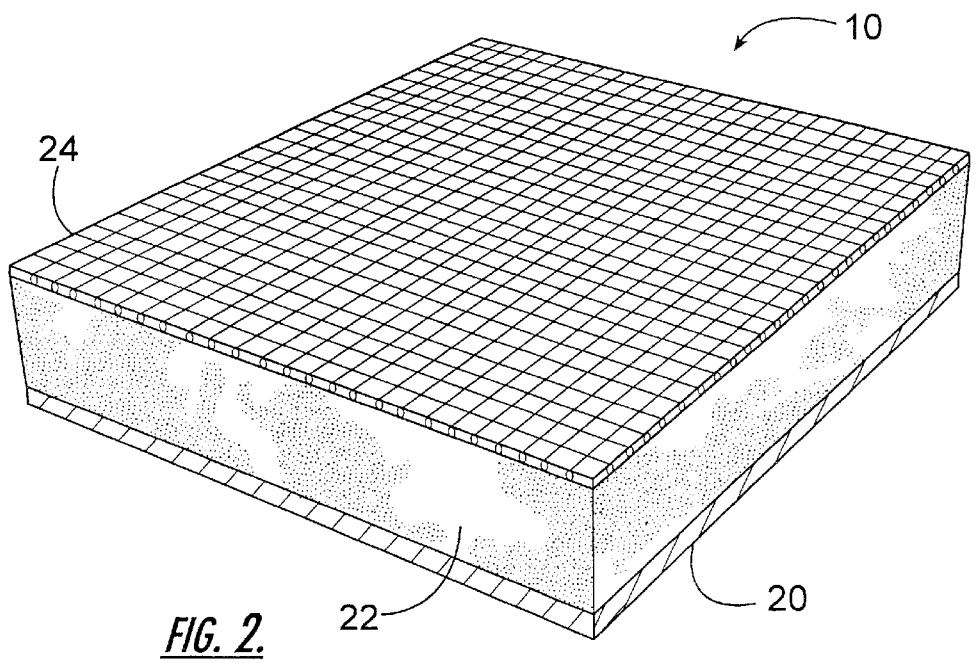
FIG. 2 is a cross-sectional view of a reactive multi-layer composite mat barrier.

The reactive multi-layer composite mat 10 as shown in one embodiment in FIG. 2 has three principal parts. A backing material 20 creates the layer which abuts the native soil 14 when placed in a below-ground hazardous material storage area. Active layer 22 is placed on backing material 20. Fronting material 24 is placed on top of active layer 22 so that the active layer 22 is placed in between the fronting material 24 and the backing material 20.

The backing material 20 may be made of many different types of material. The material selected to make the backing material 20 is dependent upon the environmental conditions into which the reactive multi-layer composite mat is going to be placed. For example, if the backing material is to be placed on soil where the soil is well drained, a semi-permeable material may be used. If a semi-permeable material is used, this will allow any water which enters the hazardous material storage area to drain into the surrounding soil. If, however, there is a possibility that ground water from the soil below may enter into the hazardous material storage area, then an impermeable material may be used to prevent additional water from entering. The material may be of various types including woven and nonwoven fabrics, geotextiles and membranes.

The backing material 20 can be made of any suitable porous or nonporous material. Nonporous backing members can be made of high density polyethylene, flexible polypropylene, plasticized polyvinyl chloride, flexible polypropyl, and various natural or synthetic rubbers.

One embodiment of the present invention may be provided by modifying the structure and composition of bentonite mats, which are well known in the art. Such mats, in accordance with one aspect of this invention, may be constructed with a layer of a reactive material selected for a particular waste contaminant. As used herein, "layer" may mean one or more identifiable strata within the mat. Alternatively, the term "layer" also encompasses a portion of a mat including the reactive material and any intermixed materials or fillers. For instance, an existing bentonite mat may be modified in accordance with this invention by mixing a reactive material with the existing bentonite. The resulting bentonite/reactive material mixture therefore comprises a layer of reactive material.

The reactive mats may be provided in the form of long, continuous rolls which are cut to size. Such mats have sufficient flexibility that they may conform to contours of a placement surface. Any of the reactive materials referenced herein may be added as a layer within a bentonite-type mat. Such mats would maintain their useful characteristics of flexibility and may be easily constructed using traditional mat-forming techniques. Such mats may be stacked with or without intervening filler layers, and mats having different reactive materials may be used together in a single application.

Figure 3:
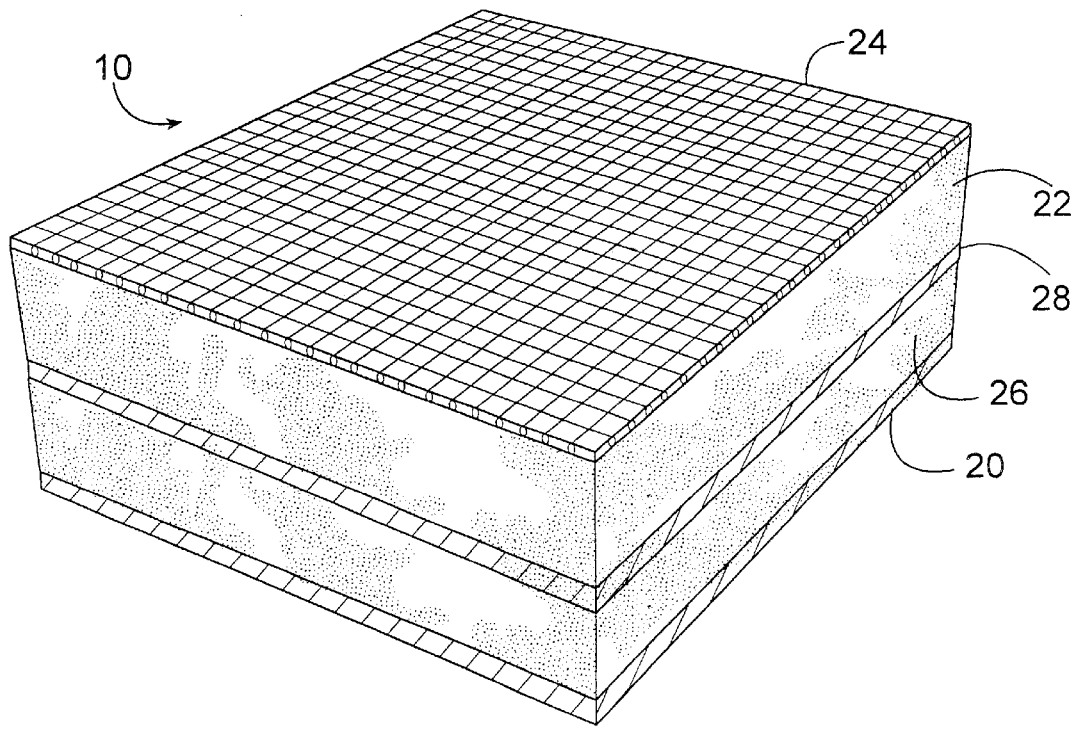
FIG. 3 is a cross-sectional view of an alternative embodiment of a reactive multi-layer composite mat.

An additional embodiment is seen in reference to FIG. 3, where a first active layer 22 and a second active layer 26 are provided. The active layers 22 and 26 include at least one reactive agent which is selected to stabilize a specific hazardous material. The active layer 22 can be comprised of many different substances as long as one reactive agent is included. Some of the reactive agents that may be included are ion exchange resins, zeolites (natural and synthetic), clays, modified clays, cements, reducing agents, reactive blast furnace slag, reagent chemicals, sodium titanate, magnesium phosphate, amorphous silica, amorphous alumina, calcium hydroxide, kiln dust, and surface active refractories. The nonreactive parts of the active layer are materials well known in the art, including sands, fly ashes, synthetic fibers, kiln dust, and crushed lightweight aggregates. Several reactive agents may be mixed in the active layer or may be separated into distinct layers. As shown in FIG. 3, first layer 22 is separated from second layer 26 by barrier material 28. Selection of barrier material 28 should be made generally using the same factors for which one decided the material of backing material 20.

Fronting material 24 in FIGS. 2 and 3 is placed on top of the active layers so that the active layers are between the fronting material 24 and the backing material 20. Additional layers of barrier material may be placed in the reactive multi-layer composite mat as needed.

The active layer reactive agents and amounts should be chosen carefully based on the hazardous material and quantity which will be surrounded by the reactive multi-layer composite mat. For example, ion exchange resins and zeolites should be chosen to effectively stabilize cesium and strontium ions. Reducing agents and blast furnace slag can effectively stabilize tecnicium, chromium, and neptunium species. Titanates and phosphates can effectively stabilize plutonium and uranium species with multiple valance states. Clay materials, such as bentonite, can effectively reduce the permeability of the reactive multi-layer composite mats 10, and some clays, such as attapulgite clay, can stabilize some cations such as cesium and strontium. The clay-like agents stabilize the hazardous materials by, for example, pH/Eh adjustment, precipitation, coprecipitation, solid solution formation, adsorption, and ion exchange. The active layers may also include stabilizing materials, fillers, and functional fillers. The use of fillers such as sand or gravel can be used to control the permeability of the layer.

The amount of reactive agent that should be added to the active layer varies greatly. The type and specific amount of reactive agent required in the active layers depends upon the targeted hazardous material. Barriers can contain approximately 5 to 50 weight percent of the reactive agents. The amount depends on the volume, the type, and concentration of the hazardous material.

Reactive backfill 16, which surrounds the hazardous material container 18, should also be carefully selected so as to minimize the danger of the hazardous material leaking and leaving the hazardous material storage area 20 and contaminating the surrounding soil 14.

The reactive backfill 16 should include at least one reactive agent which can stabilize a hazardous material should the hazardous material escape from the storage container holding the hazardous material. Reactive backfill 16 is preferably a conventional controlled low strength material modified to include at least one of the reactive agents which could be mixed in the active layer. The reactive agents could be, for example, ion exchange resins, zeolites, clays, modified clays, cements (e.g., portland, calcium alumina sulfate, sulfur, alumina, magnesium hydrosilicate, and calcium chloroaluminate, reducing agents (e.g., iron fillings, iron powder, thiosulfate, sulfur and other various metallic agents), reactive blast furnace slag, reagent chemicals, sodium titanate, magnesium phosphate, amorphous silica, amorphous alumina, calcium hyrdoxide, kiln dust, and surface active refractories.

The amount of reactive agent added to the reactive backfill depends on the concentration, volume, and type of hazardous material as well as the volume of the reactive backfill added to the hazardous material storage area.

One example of a reactive backfill which would stabilize hazardous material and reduce the migration of these contaminants to the reactive multi-layer composite mat and ultimately to the surrounding soil is a modification of a conventional controlled low strength material (CLSM) mix design. The recipe for one such mix design is given in Table A below.

TABLE A

|  | Wt. % | Lbs./yd$^3$ | Kg/m$^3$ |
| --- | --- | --- | --- |
| Cement | 1.4 | 50 | 29 |
| Fly Ash | 15.6 | 560 | 329 |
| Sand | 63.0 | 2250 | 1324 |
| Reagents | 5 | 180 (max.) | 106 (max.) |
| Water | 15 | 64 ± 3 gallons | 243 liters |

Note
Pond ash or weathered coal ash may be totally or partially substituted for fly ash.

Some additional examples of mixed designs are illustrated in Table B.

As known by those skilled in the art, many variations of the mix design may produce the same result as long as the reactive agent is added to the mix. Reactive backfills can be designed to meet a wide range of stabilization requirements and physical and engineering property requirements. The following properties have been modified in the laboratory: chemical stabilization potential, compressive strength (30 to 120 psi), permeability ($10^{-2}$ to $10^{-7}$ cm/second). It should be noted that the mixes described in Table B are pumpable, flowable, and evacuatable material. These characteristics are not critical to the design; however, they do facilitate use.

The reactive backfills may be used in hazardous material storage areas or in conjunction with reactive multi-layer composite mats as well as many other applications. Other uses for reactive backfill include general construction, backfill in radioactive and/or hazardous waste contaminated storage and disposal areas; filling radioactive waste disposal containers (drums and boxes); filling waste tanks as part of a closure or subsidence prevention operation; landfill subsidence control and backfilling trenches and vaults; environmental restoration efforts and new landfill materials of construction.

The reactive materials and compositions set forth herein are also useful for the filling and closure of hazardous waste tanks. The reactive materials are particularly useful for inclusion in zero-bleed cement-containing compositions as taught in PCT international application entitled "Admixture For Zero-Bleed Mixtures, Grouts, and Cements", having Attorney Docket No. WSR-6-PCT, filed on Mar. 5, 1999, and which is incorporated herein by reference. A method for containing hazardous waste includes the steps of placing a reactive multi-layer composite mat 12 in a position to receive reactive backfill 16 and hazardous waste container 18. A water-inhibiting cap 30 may be placed over the mat, backfill, and hazardous material to prevent additional water from entering.

Whether using the method for storing hazardous materials or using the hazardous material storage area, the net effect is the same. By placing a reactive multi-layer composite mat in an opening in the soil and putting therein a reactive backfill and hazardous waste, the surrounding soil will be protected from contamination. If the hazardous material, which should be stored in a storage container, leaks or leaches from the storage container, the reactive backfill should prevent the contamination of the surrounding soil. First, the backfill will impede the flow of the hazardous material. Secondly, any hazardous material which reaches the reactive backfill components will be stabilized or neutralized. Should the hazardous material reach the reactive multi-layer composite mat, the active layer of that mat will neutralize or stabilize the hazardous material. The water-inhibiting cap will prevent additional water from entering and moving the hazardous material within the hazardous material storage area. The fronting, backing, and barrier materials of the mat may also act to inhibit the flow of contaminants from inside the hazardous material storage area to the surrounding soil. If those layers are impermeable, then water will not be able to transport the hazardous materials out of the storage area. If it is semi-permeable, the hazardous material within the leachate will be neutralized within the reactive backfill or the active layers of the mat.

While one or more preferred embodiments of the invention have been described above, it should be understood that any and all equivalent realizations of the present invention are included within the scope and spirit thereof. For example, the present invention may be embodied in a variety of reactive backfill compositions and reactive multi-layer composite mat constructions. Thus, it should be understood by those of ordinary skill in this art that the present invention is not limited to these embodiments, since modifications can be made.

Therefore, it is contemplated that any and all such embodiments are included in the present invention as may fall within the literal or equivalent scope of the appended claims.

TABLE B

| | Pumpable | Self-Leveling | Permeability (cm/sec.) | Compressive Strength (psi) |
|---|---|---|---|---|
| Design Mix A | Y | Y | $2 \times 10^{-5}$ | Less than 150 |
| Design Mix B (mix A plus 2 wt. percent bentonite plus water) | Y | Y | Less than $5 \times 10^{-7}$ | Less than 150 |
| Design Mix C (mix A plus 5 wt. percent cement) | Y | Y | Less than $5 \times 10^{-7}$ | 500–1000 |

What is claimed is:

1. A reactive multi-layered composite mat for hazardous waste containment comprising:
   a first water permeable active layer, wherein said first active layer includes at least one reactive agent for stabilizing a constituent present within hazardous waste;
   a second water permeable active layer, said second active layer including at least one reactive agent for stabilizing a constituent present within a hazardous material;
   a backing material opposite a first side of said first active layer;
   a barrier material separating said first active layer from said second active layer; and,
   a fronting material positioned opposite said second active layer so that said first and second active layers are positioned between said backing and said fronting materials and separated therebetween by said barrier material.

2. The composite mat according to claim 1, wherein said at least one reactive agent includes at least one member selected from the group of ion exchange resins, zeolites, clays, modified clays, cements, reducing agents, reactive blast furnace slag, reagent chemicals, sodium titanate, magnesium phosphate, amorphous silica, amorphous alumina, calcium hydroxide, kiln dust and surface active refractories.

3. The composite mat according to claim 1, wherein the composition of the mat controls the movement of water through the mat.

4. The composite mat according to claim 3, wherein said at least one of the fronting material and backing material is a fabric web.

5. The composite mat according to claim 3, wherein said at least one of the front material and backing material is nonwoven.

6. The composite mat according to claim 3, wherein said backing material is an impermeable membrane.

7. The composite mat according to claim 1, wherein said active layer further includes a filler.

8. The composite mat according to claim 7, wherein said filler is selected from the group of bentonite, vermiculite, perilite, sand, and diatomaceous earth.

* * * * *